(12) United States Patent
Stern

(10) Patent No.: US 12,216,101 B2
(45) Date of Patent: Feb. 4, 2025

(54) CHROMATOGRAPHY APPARATUS AND METHOD

(71) Applicant: Cytiva Sweden AB, Uppsala (SE)

(72) Inventor: Ana Stern, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 467 days.

(21) Appl. No.: 17/620,035

(22) PCT Filed: Jun. 16, 2020

(86) PCT No.: PCT/EP2020/066646
§ 371 (c)(1),
(2) Date: Dec. 16, 2021

(87) PCT Pub. No.: WO2020/260074
PCT Pub. Date: Dec. 30, 2020

(65) Prior Publication Data
US 2022/0252561 A1    Aug. 11, 2022

(30) Foreign Application Priority Data
Jun. 27, 2019   (GB) .................................... 1909275

(51) Int. Cl.
*G01N 30/86* (2006.01)
*B01D 15/34* (2006.01)

(52) U.S. Cl.
CPC ......... *G01N 30/8675* (2013.01); *B01D 15/34* (2013.01)

(58) Field of Classification Search
CPC .......... G01N 30/8689; G01N 30/8675; B01D 15/34; B01D 15/26
See application file for complete search history.

(56) References Cited

U.S. PATENT DOCUMENTS 5,173,404 A   12/1992 DiZerega et al.
5,183,604 A    2/1993 Langhorst et al.
(Continued)

FOREIGN PATENT DOCUMENTS

JP    54-006597 A    1/1979
JP    61-178923 A    8/1986
(Continued)

OTHER PUBLICATIONS

PCT International Search Report and Written Opinion for PCT/EP2020/066646, mailed Oct. 14, 2020 (11 pages).
(Continued)

*Primary Examiner* — Lam S Nguyen
(74) *Attorney, Agent, or Firm* — Eversheds-Sutherland (US) LLP

(57) ABSTRACT

The present invention relates to a computer implemented method (600) performed by a chromatography apparatus (400) configured to separate molecules, having varying size, from an eluent, the method comprising obtaining (610) reference data for a chromatography column of the chromatography apparatus, wherein the reference data is indicative of elution characteristics for a set of molecular sizes, obtaining (620) an elution progress measure and a corresponding quantitative measure indicative of a concentration of molecules in an eluate of the chromatograph) apparatus, estimating (630) a size measure indicative of molecular size of the molecules in the eluate, rendering (640) a representation (300) indicative of the quantitative measure and the size measure, controlling (650) a display to display the representation to a user of the chromatography apparatus.

11 Claims, 7 Drawing Sheets

(56) References Cited

U.S. PATENT DOCUMENTS

2006/0266708 A1    11/2006  Yu et al.
2019/0154579 A1*   5/2019   Horigome .......... G01N 30/8675

FOREIGN PATENT DOCUMENTS

| JP | 2006-317198 A | 11/2006 |
|----|---------------|---------|
| JP | 2008-241274 A | 10/2008 |
| JP | 2016-003954 A | 1/2016 |
| JP | 2016-133353 A | 7/2016 |
| WO | 2015/029790 A1 | 3/2015 |
| WO | 2015186113 A1 | 12/2015 |

OTHER PUBLICATIONS

GB Search Report for GB1909275.8, dated Dec. 18, 2019 (3 pages).
JP Office Action for corresponding JP Application No. 2021-577099, dated Feb. 19, 2024, 13 pages.

* cited by examiner

CHROMATOGRAPHY APPARATUS AND METHOD

CROSS REFERENCE TO RELATED APPLICATIONS

This application is a National Phase Application of PCT/EP2020/066646, filed on Jun. 16, 2020, which claims the benefit of GB Application No. 1909275.8, filed Jun. 27, 2019, the entire contents of which are incorporated by reference herein.

TECHNICAL FIELD

The present invention relates to a method for controlling a chromatography apparatus. The invention further relates to a chromatography apparatus performing the method.

BACKGROUND

Chromatography is a well-known process for analyzing and preparing chemical mixtures or chemical samples. The sample may typically be suspended in a fluid, referred to as a buffer composition or resin. The various sample components of the mixture travel at different speeds down the chromatography column, causing them to separate. This process may sometimes be referred to as size exclusion chromatography.

In size exclusion chromatography large molecules elute first, since they do not have access to the pores in the resin and thus have access to a smaller volume. Small molecules diffuse into the pores, and thus have access to larger volume as they pass through the column. This is further explained e.g. in https://en.wikipedia.org/wiki/Size-exclusion_chromatography.

This separation may be used to separate the sample components in a fractionation step where the mobile phase, in a process called elution, may be directed to different fractionation containers or container, e.g. by an outlet valve of the chromatography apparatus.

A problem with conventional solutions is that, to estimate the molecular weight of molecules in the different containers, the user is forced to perform post-elution and post-fractionation analysis, where chromatography process time or eluate volume are analyzed to estimate molecular weight of molecules in the different containers. Performing such post-elution analysis is a cumbersome, and time-consuming operation.

A further problem with conventional solutions is that it is not possible to activate or deactivate fractionation to respectively collect or discard molecules depending on their estimated molecular weight.

Thus, there is a need for an improved method for controlling fractionation in a chromatography apparatus.

OBJECTS OF THE INVENTION

An objective of embodiments of the present invention is to provide a solution which mitigates or solves the drawbacks and problems described above.

SUMMARY OF THE INVENTION

The above and further objectives are achieved by the subject matter described herein. Further advantageous implementation forms of the invention are further defined herein According to a first aspect of the invention, the above mentioned and other objectives are achieved by a computer implemented method performed by a chromatography apparatus configured to separate molecules, having varying size, from an eluent, the method comprising obtaining reference data for a chromatography column of the chromatography apparatus, wherein the reference data is indicative of elution characteristics for a set of molecular sizes, obtaining an elution progress measure and a corresponding quantitative measure indicative of a concentration of molecules in an eluate of the chromatography apparatus, estimating a size measure indicative of molecular size of the molecules in the eluate, rendering a representation indicative of the quantitative measure and the size measure and controlling a display to display the representation to a user of the chromatography apparatus.

In a first embodiment according to the first aspect, the molecular size is estimated using a predetermined relation, comprised in the reference data, and the elution progress measure.

In a second embodiment according to the first embodiment, the predetermined relation is indicating a curve, and the predetermined relation is obtained by performing curve fitting of value pairs comprising a gel-phase distribution coefficient and corresponding molecular size.

In a third embodiment according to the second embodiment, the elution progress measure is elution volume, wherein the gel-phase distribution coefficient is dependent on a total volume of the column, the elution volume and column void volume.

In a fourth embodiment according to the third embodiment, the gel-phase distribution coefficient Kav is given by the relation Kav=((Ve−V0))/((Vt−V0)), where Ve is the elution volume, V0 is the column void volume and Ve is the elution volume.

In a fifth embodiment according to any of the first to fourth embodiments, wherein the predetermined relation is a polynomial relation.

In a sixth embodiment according to the first aspect or any of the preceding embodiments, the quantitative measure is indicative of ultraviolet light absorption of the eluate.

In a seventh embodiment according to the first aspect or any of the preceding embodiments, the elution progress measure is indicative of elution process running time or eluate volume.

In an eighth embodiment according to the first aspect or any of the preceding embodiments, the representation is a diagram having the quantitative measure represented on a first axis and the estimation of the molecular weight on a second axis.

In a ninth embodiment according to the first aspect or any of the preceding embodiments, the method further comprises activating or deactivating fractionation using the molecular size and one or more predetermined intervals of molecular sizes.

At least one advantage of the first aspect is that molecular weight and/or molecular size of molecules in the eluate can be dynamically determined, thereby avoiding the cumbersome, complex and time-consuming operation of performing post-fractionation analysis. A further advantage is that the duration of the chromatography process can be shortened, by dynamically rendering and presenting a representation of the molecular weight and/or molecular size to the user in real time, thereby enabling the user to terminate the chromatography process once the eluate, comprising the desired molecular weight and/or molecular size, has been retrieved.

According to a second aspect of the invention, the above mentioned and other objectives are achieved by a chromatography apparatus configured to separate molecules, having varying size, from an eluent, the chromatography apparatus comprising a column, a display and a control unit comprising circuitry. The circuitry comprising processing circuitry, and a memory, said memory comprising instructions executable by said processing circuitry, whereby said chromatography apparatus is configured to perform the method according to the first aspect.

The advantages of the second aspect of the invention are at least the same as for the first aspect of the invention.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

Figure 1:
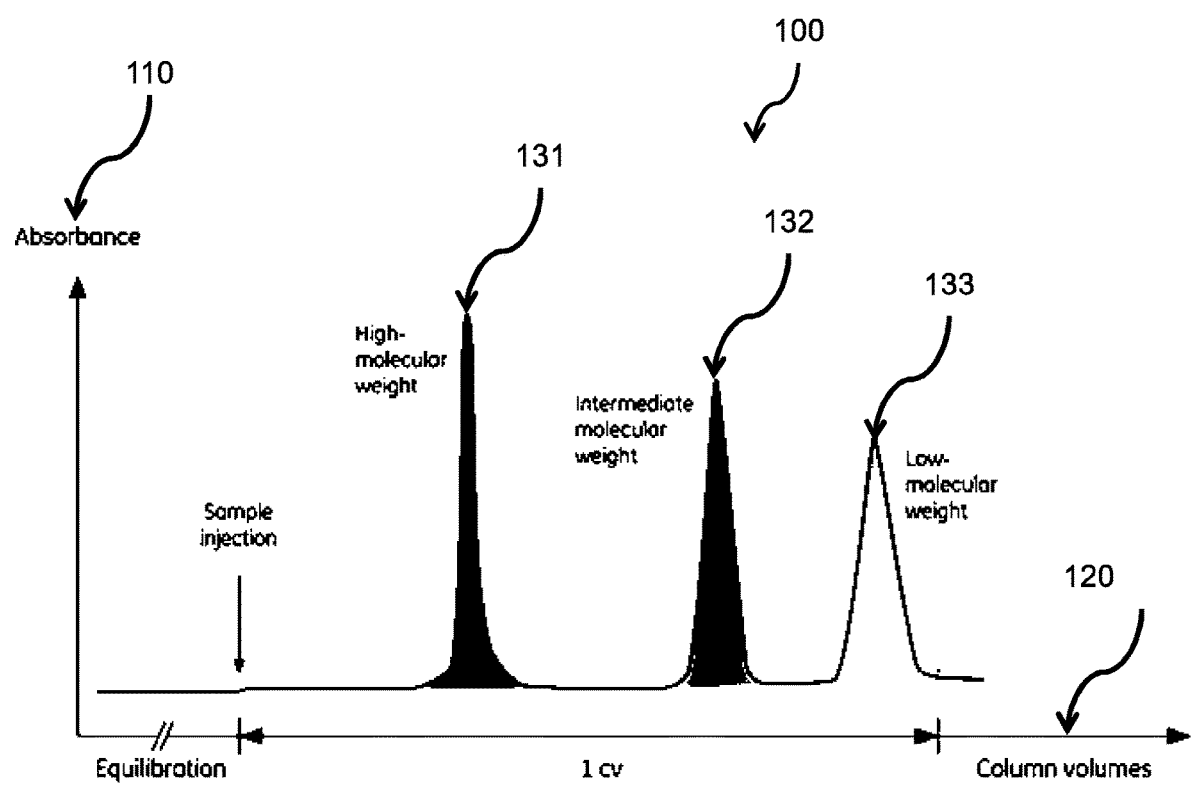
FIG. 1 shows an example of a diagram rendered and/or displayed by a prior art chromatography apparatus.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

In the present disclosure reference will be made interchangeably to container or reservoir, signifying a receptacle suitable for holding fluid.

In the present disclosure reference will be made interchangeably to processing circuitry and processing means.

In the present disclosure, the term "size measure" is a measure indicative of molecular volume and/or weight, e.g. indicative of molecular volume and/or weight of molecules comprised in the eluent and processed in the chromatography process. Examples of such size measures are estimated molecular weight and/or estimated molecular size.

FIG. 1 shows a diagram rendered and/or displayed by a prior art chromatography apparatus 400. The diagram comprises a vertical axis 110, indicating a quantitative measure indicative a concentration of molecules in the eluate. E.g. a measure of ultraviolet, UV, light absorption of the eluate emerging from a chromatography column of the chromatography apparatus 400. In other words, the quantitative measure indicates a concentration of molecules comprised by the eluate, that is registered by a sensor, e.g. a sensor that measures absorbed light, e.g. UV light. The diagram further comprises a horizontal axis 120, indicative of a progress measure of the chromatography and/or fractionation process. Examples of the progress measure may be chromatography process time or eluate volume. As can be seen from FIG. 1, three peaks 131, 132, 133 of the quantitative measure can be registered. Each peak typically corresponds to a particular molecule having a particular molecular weight and molecular size.

However, even if the quantitative measure is visualized/displayed/presented to a user of the chromatography apparatus 400, the user has no means of assessing the molecular weight and/or molecular size of molecules represented by any of the peaks 131, 132, 133, and is required to rely on process time or eluate volume. In other words, the user may manually control fractionation, e.g. based on the peaks 131, 132, 133, but will have to rely on post-fractionation analysis to identify molecular weight and/or molecular size of molecules represented by any of the peaks 131, 132, 133.

In one example, a user is interested to extract a protein having a particular molecular weight using size exclusion chromatography. The user will then have to complete the chromatography and fractionation process, or chromatography run, and then perform a post fractionation analysis to identify the wanted protein. The post fractionation analysis is typically performed by obtaining a calibration curve and applying a formula to transform chromatography process time or eluate volume to molecular weight and/or molecular size.

Performing post-fractionation analysis is a cumbersome, complex and time-consuming operation, and further requires that the chromatography process is completed before the molecular weight and/or molecular size of molecules in the eluate can be determined.

Figure 2A:
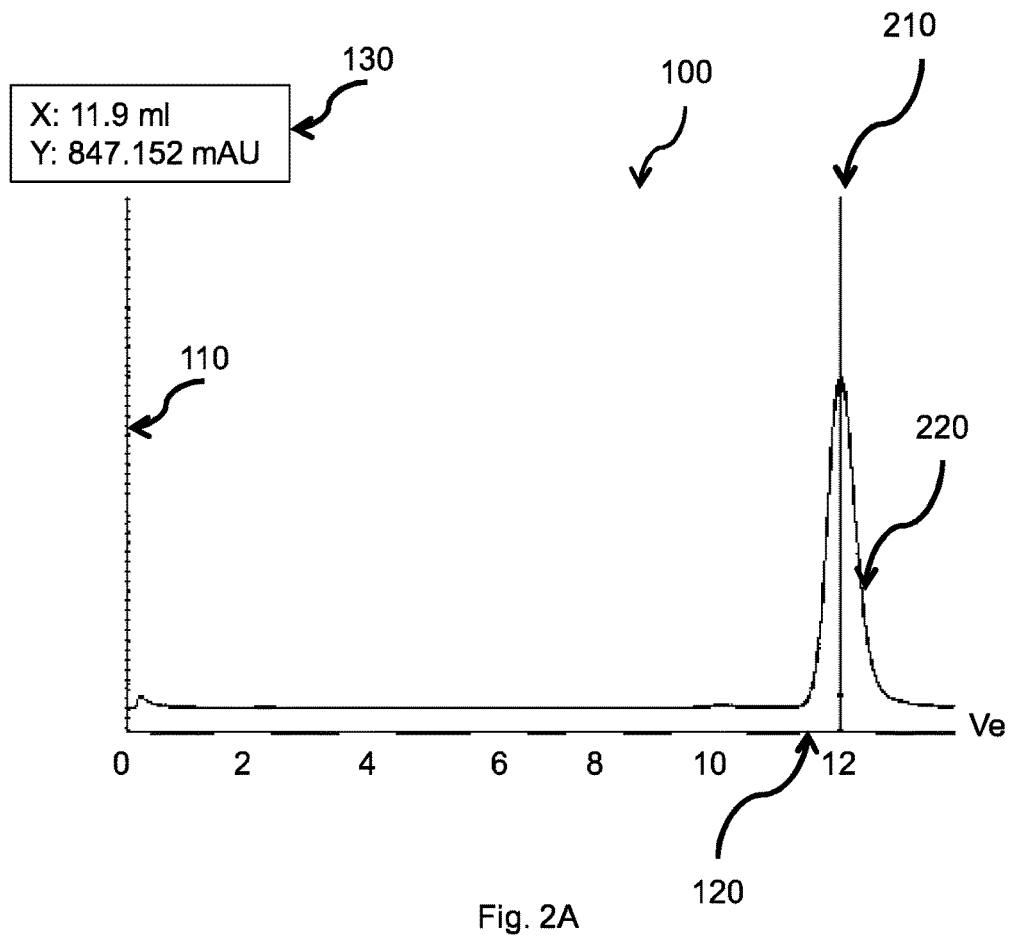
FIG. 2A-B shows examples of conventional diagrams.

FIG. 2A shows an example of a conventional diagram. As described in relation to FIG. 1, the diagram has a vertical axis 110 and a horizontal axis 120. Further, the diagram comprises a display box, detailing a quantitative measure value Y (vertical axis) and a progress measure value X (horizontal axis) of a marker 210 placed on a displayed curve 220. The curve is indicative of quantitative measure values versus corresponding progress measures. In this example, the quantitative measure Y is given in Absorption Units, mAU. The progress measure value X is given in chromatography eluate volume Ve.

Figure 2B:
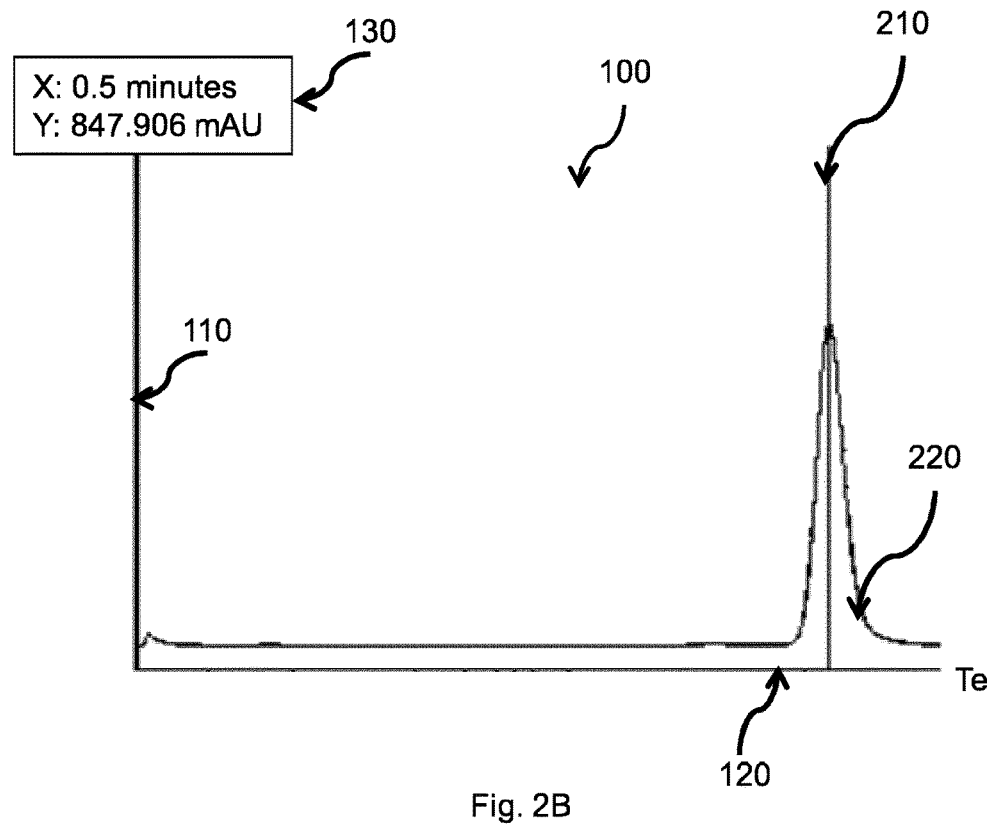

FIG. 2B shows an example of a conventional diagram. As described in relation to FIG. 1, the diagram has a vertical axis 110 and a horizontal axis 120. Further, the diagram comprises a display box, detailing a quantitative measure value Y (vertical axis) and a progress measure value X (horizontal axis) of a marker 210 placed on a displayed curve 220. The curve is indicative of quantitative measure values versus corresponding progress measures. In this example, the quantitative measure Y is given in Absorption Units, mAU. The progress measure value X is given in chromatography process time Te.

Figure 3:
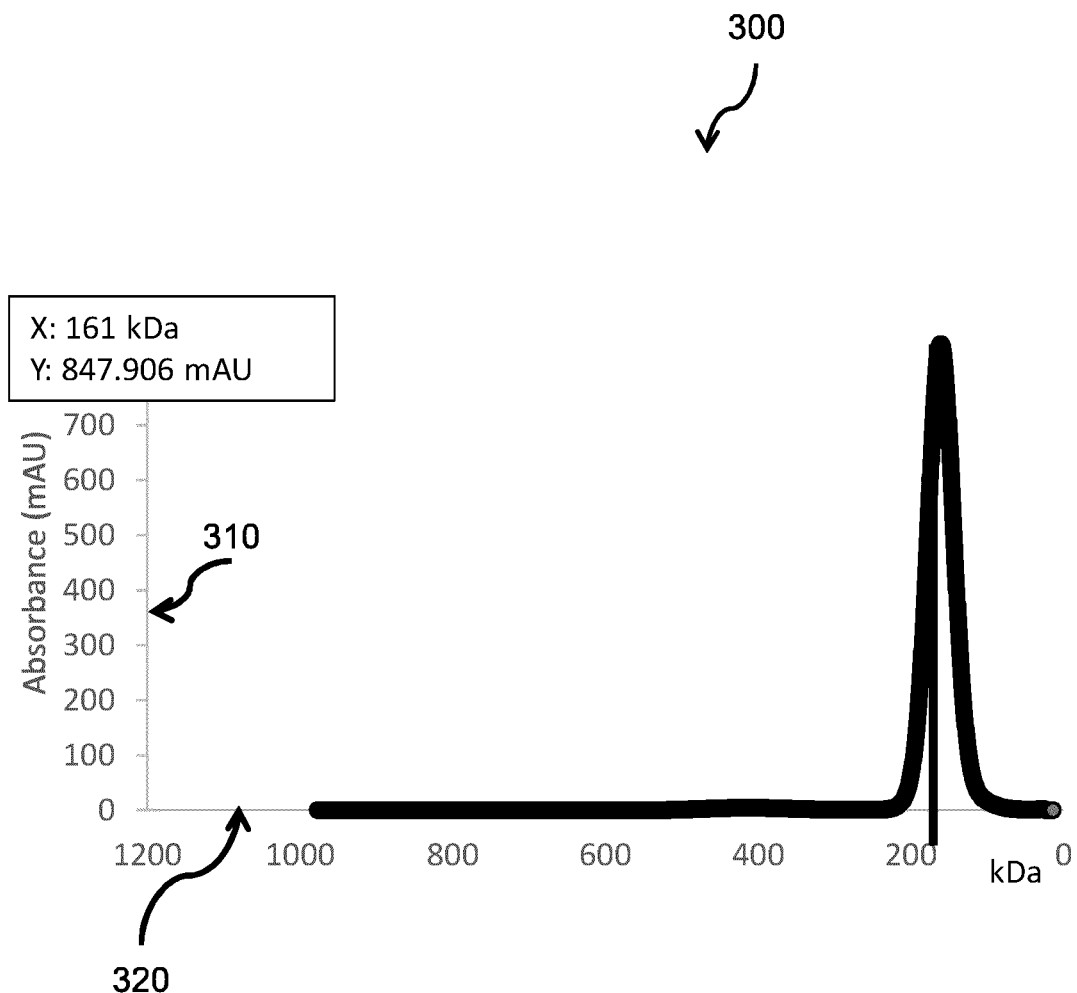
FIG. 3 shows a diagram according to one or more embodiments of the disclosure.

FIG. 3 shows a diagram 300 according to one or more embodiments of the disclosure. In the method of the disclosure reference data, indicative of elution characteristics for a set of molecular sizes, is used to dynamically determine a size measure, such as estimated molecular weight and/or molecular estimated size, using chromatography process time or eluate volume of the chromatography apparatus 400.

A representation is then rendered and/or displayed. The representation is typically indicative of the quantitative measure and/or the size measure in a diagram 300.

The diagram 300 comprises a vertical axis 310, indicating a quantitative measure indicative a concentration of molecules in the eluate. E.g. similar to what is described in relation to FIG. 1-FIG. 2. The diagram further comprises a horizontal axis 320, indicative of the size measure. In this example represented by the atomic mass unit Dalton or kiloDalton, kDa.

This has the advantage of speeding up the size exclusion chromatography process and making the process more efficient, by dynamically providing the user with information on the size and/or weight of the molecules comprised by the eluate.

Figure 4:
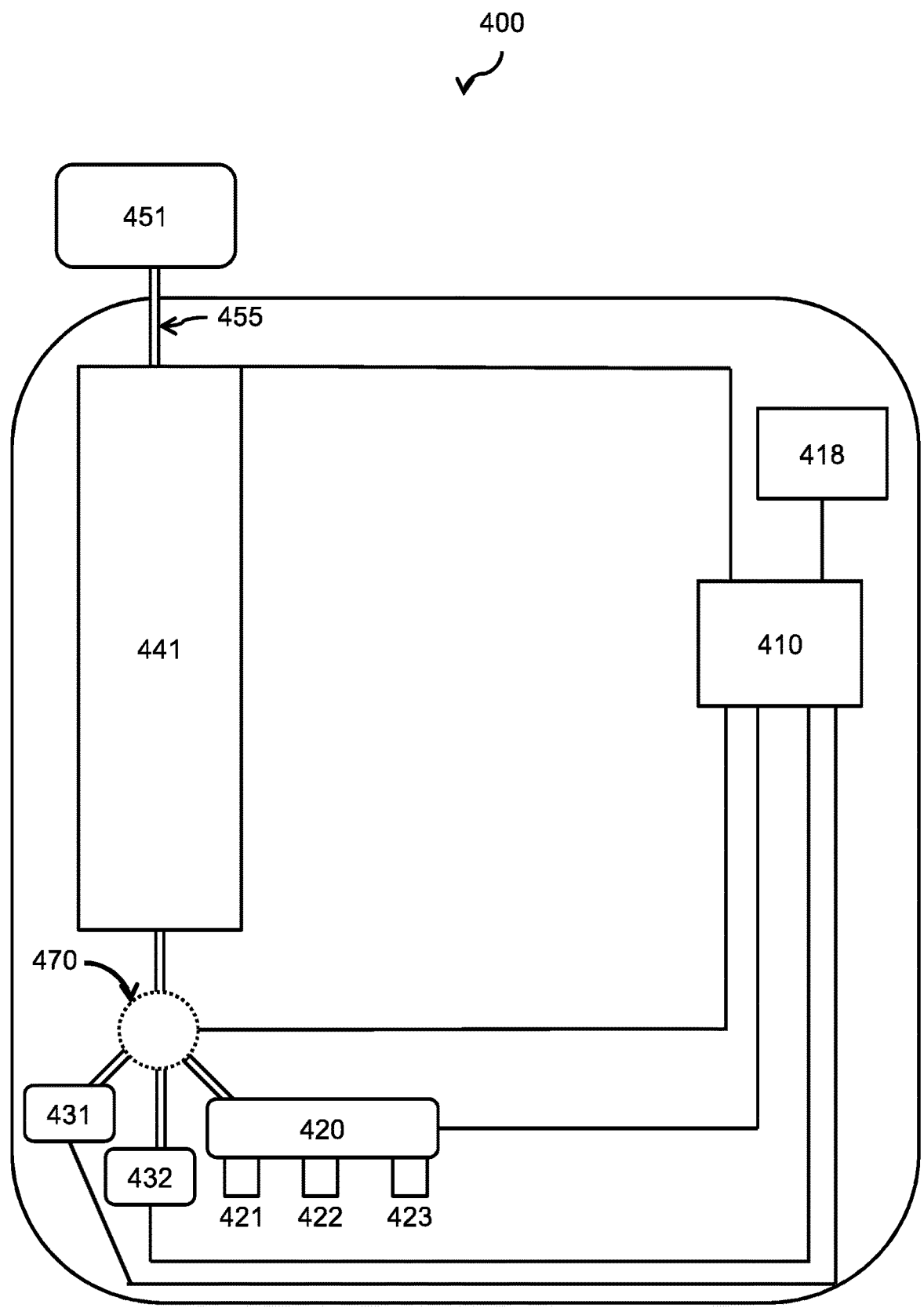
FIG. 4 shows a chromatography apparatus according to one or more embodiments of the disclosure.

FIG. 4 shows a chromatography apparatus 400 according to one or more embodiments of the disclosure. The chromatography apparatus 400 may typically comprise at least one inlet 455. The inlet may optionally be coupled to a reservoir 451 configured to hold a fluid, e.g. the eluent. The inlet 455 may e.g. be implemented as tubular elements such as a tube or hose. The inlet 455 may be configured to be coupled to a column 441. The column 441 may be comprised in the chromatography apparatus 400 or arranged external to the chromatography apparatus 400.

The chromatography apparatus 400 may further comprise a control unit 410 which comprises circuitry, e.g. a processor and a memory. The memory may contain instructions executable by the processing circuitry, whereby said control unit 410 and/or chromatography apparatus is operative to perform any of the steps or methods described herein. The control unit 410 is further described in relation to FIG. 5.

The chromatography apparatus 400 may optionally comprise a splitter 470 coupled to a fluid outlet of the column 441 and coupled to a selection of any of a UV sensor 431, a conductivity sensor 432 and an outlet valve 420. The splitter 470 may be configured to direct fluid received from the column 441 to any of the UV sensor 431, the conductivity sensor 432 and the outlet valve 420. Optionally the splitter 470 may be communicatively coupled to the control unit and perform coupling of fluid to any of the UV sensor 431, the conductivity sensor 432 and the outlet valve 420 in response to one or more control signals from the control unit 410.

The UV sensor 431 may be communicatively coupled to the control unit 410 and configured for measuring the quantitative measure, such as UV light absorbance of the fluid, provided by the splitter 470. The chromatography apparatus 400 may further comprise a conductivity sensor 432 communicatively coupled to the control unit 410 and configured for measuring the quantitative measure, e.g. conductivity of the fluid, provided by the splitter 470. The UV sensor 431 and/or the conductivity sensor 432 may further be configured to provide the measured quantitative measure as control signals comprising measurement data to the control unit 410.

The chromatography apparatus 400 may further comprise an outlet valve 420 coupled to the splitter 470. The outlet valve 420 may have one or more outlets or outlet ports 421-423 and is configured to provide the fluid provided by the splitter 470 to the one or more outlets 421-423 in response to a control signal, e.g. received from the control unit 410. In other words, performing fractionation of the eluate.

Figure 5:
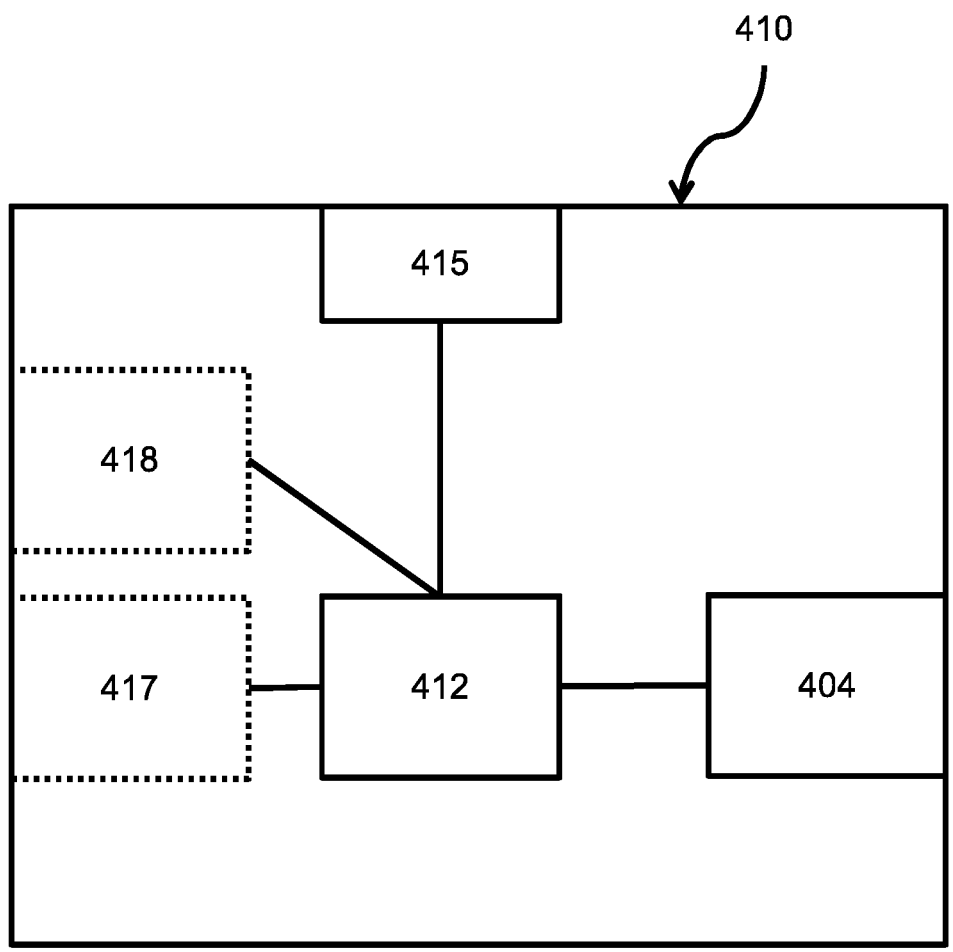
FIG. 5 shows a control unit according to one or more embodiments of the present invention.

FIG. 5 shows the control unit 410 according to one or more embodiments of the present invention. The control unit 410 may be in the form of e.g. an Electronic Control Unit, a server, an on-board computer, a stationary computing device, a laptop computer, a tablet computer, a handheld computer, a wrist-worn computer, a smart watch, a smartphone or a smart TV. The control unit 410 may comprise processing circuitry 412 communicatively coupled to a transceiver 404 configured for wired or wireless communication. The control unit 410 may further comprise at least one optional antenna (not shown in figure). The antenna may be coupled to the transceiver 404 and is configured to transmit and/or emit and/or receive wired or wireless signals in a communication network, such as WiFi, Bluetooth, 3G, 4G, 5G etc. In one example, the processing circuitry 412 may be any of a selection of processing circuitry and/or a central processing unit and/or processor modules and/or multiple processors configured to cooperate with each-other. Further, the control unit 410 may further comprise a memory 415. The memory 415 may e.g. comprise a selection of a hard RAM, disk drive, a floppy disk drive, a flash drive or other removable or fixed media drive or any other suitable memory known in the art. The memory 415 may contain instructions executable by the processing circuitry to perform any of the steps or methods described herein. The processing circuitry 412 may be communicatively coupled to a selection of any of the transceiver 404, the memory 415 the pH sensor 431, the conductivity sensor 432, the outlet valve 420 and the splitter 470. The control unit 410 may be configured to send/receive control signals directly to any of the above-mentioned units or to external nodes or to send/receive control signals via the wired and/or wireless communications network.

The wired/wireless transceiver 404 and/or a wired/wireless communications network adapter may be configured to send and/or receive data values or parameters as a signal to or from the processing circuitry 412 to or from other external nodes. E.g. measured quantitative measures.

In an embodiment, the transceiver 404 communicates directly to external nodes or via the wireless communications network.

In one or more embodiments the control unit 410 may further comprise an input device 417, configured to receive input or indications from a user and send a user input signal indicative of the user input or indications to the processing circuitry 412.

In one or more embodiments the control unit 410 may further comprise a display 418 configured to receive a display signal indicative of rendered objects, such as text or graphical user input objects, from the processing circuitry 412 and to display the received signal as objects, such as text or graphical user input objects.

In one embodiment the display 418 is integrated with the user input device 417 and is configured to receive a display signal indicative of rendered objects, such as text or graphical user input objects, from the processing circuitry 412 and to display the received signal as objects, such as text or graphical user input objects, and/or configured to receive input or indications from a user and send a user-input signal indicative of the user input or indications to the processing circuitry 412.

In a further embodiment, the control unit 410 may further comprise and/or be coupled to one or more additional sensors (not shown in the figure) configured to receive and/or obtain and/or measure physical properties pertaining to the chromatography apparatus 400 and send one or more sensor signals indicative of the physical properties to the processing circuitry 412. E.g. a temperature sensor measuring ambient air temperature.

In one or more embodiments, the processing circuitry 412 is further communicatively coupled to the input device 417 and/or the display 418 and/or the additional sensors and/or any of the units described in relation to FIG. 4.

In one embodiment, a chromatography apparatus 400 is provided and is configured to separate molecules, having varying size, from an eluent. The chromatography apparatus 400 comprises a column 441, a display 418 and a control unit 410 comprising circuitry, the circuitry comprising a processing circuitry 412, and a memory 415. Said memory 415 comprises or contains instructions executable by said processing circuitry 412, whereby said chromatography apparatus 400 is configured to perform any of the method steps described herein.

Figure 6:
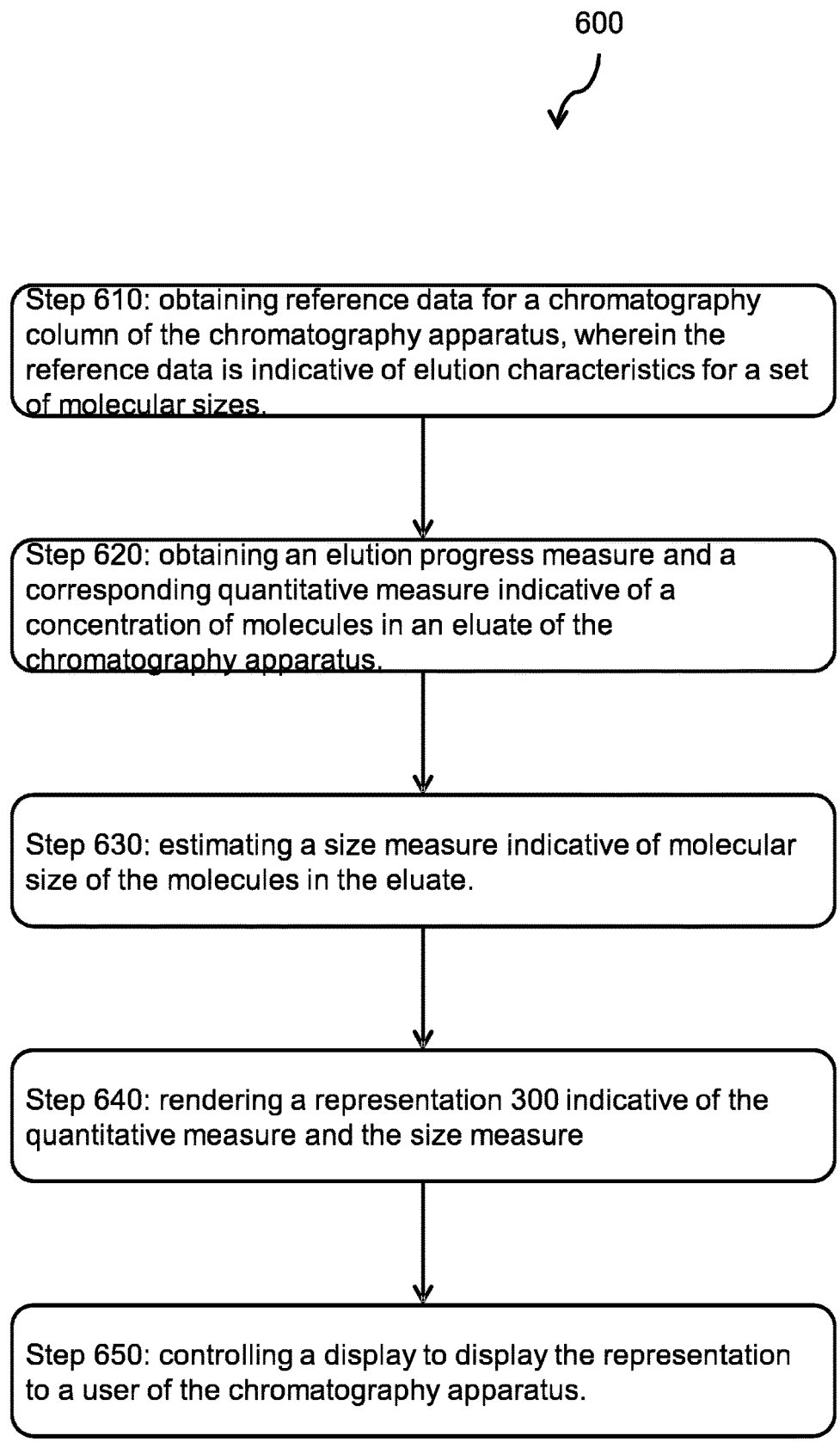
FIG. 6 shows a flowchart of a method according to one or more embodiments of the present disclosure.

FIG. 6 shows a flowchart of a method according to one or more embodiments of the present disclosure. A computer implemented method 600 performed by a chromatography apparatus 400 configured to separate molecules, having varying size, from an eluent. The method comprises:

Step 610: obtaining reference data for a chromatography column of the chromatography apparatus, wherein the reference data is indicative of elution characteristics for a set of molecules and respective molecular sizes. The elution characteristics for the set of molecular sizes may e.g. include value aggregations of a particular molecular size and chromatography process progress time or running time from when a sample is introduced to the column 411 to when a desired molecule having the particular molecular size appears in the eluate and/or exits the column of the chromatography apparatus 400. The elution characteristics for the set of molecular sizes may further e.g. include a chromatography process progress volume, e.g. an eluate volume, measured from when a sample is introduced to the column 411 to when a desired molecule having a particular molecular size appears in the eluate and/or exits the column of the chromatography apparatus 400.

In one embodiment, the reference data is obtained by retrieving the reference data from memory, e.g. memory of the control unit 415. In one embodiment, the reference data is obtained by receiving a control signal from another node, such as a server or virtual server or cloud server. The control signal may e.g. be sent/received via the communications network.

In one embodiment, the reference data comprises aggregations of a selection of any of molecular identity, molecular weight, molecular size, volume, chromatography process time, eluate volume. The reference data may be obtained by registering any one of molecular identity, molecular weight, molecular size, volume, chromatography process time, eluate volume for a reference molecule that is processed by the chromatography apparatus 400.

In one example, the reference molecule is a wanted protein with a known molecular identity, known molecular weight and known molecular size. A solution comprising the reference molecules are processed by the chromatography apparatus 400, and chromatography process time and/or eluate volume is recorded and stored in memory, e.g. in the memory of the control unit 410.

Step 620: obtaining an elution progress measure and a corresponding quantitative measure indicative of a concentration of molecules in an eluate of the chromatography apparatus.

The elution progress measure may typically e.g. be an elapsed time of running the chromatography apparatus 400. The elapsed time is typically counted from the time when the sample is initially injected into the column the chromatography apparatus 400, e.g. as shown in FIG. 1. Additionally, or alternatively, the elution progress measure may typically be an eluate volume. The eluate volume is typically measured from the point when the sample is initially injected into the column the chromatography apparatus 400, e.g. as shown in FIG. 1.

The corresponding quantitative measure is typically registered substantially simultaneously as the elution progress measure, thus obtained at a corresponding point in time as the elution progress measure.

Additionally, or alternatively, the quantitative measure is indicative of ultraviolet light absorption of the eluate.

Additionally, or alternatively, the elution progress measure is indicative of elution process running time or eluate volume.

Step 630: estimating a size measure indicative of molecular size of the molecules in the eluate.

In one embodiment, the molecular size is estimated by using a predetermined relation, comprised in the reference data, and by using the elution progress measure.

In one embodiment, the predetermined relation is indicative of or indicating a curve, and the predetermined relation is obtained by performing curve fitting of value pairs comprising a gel-phase distribution coefficient Kav and corresponding molecular size, i.e. to obtain a curve.

Figure 7:
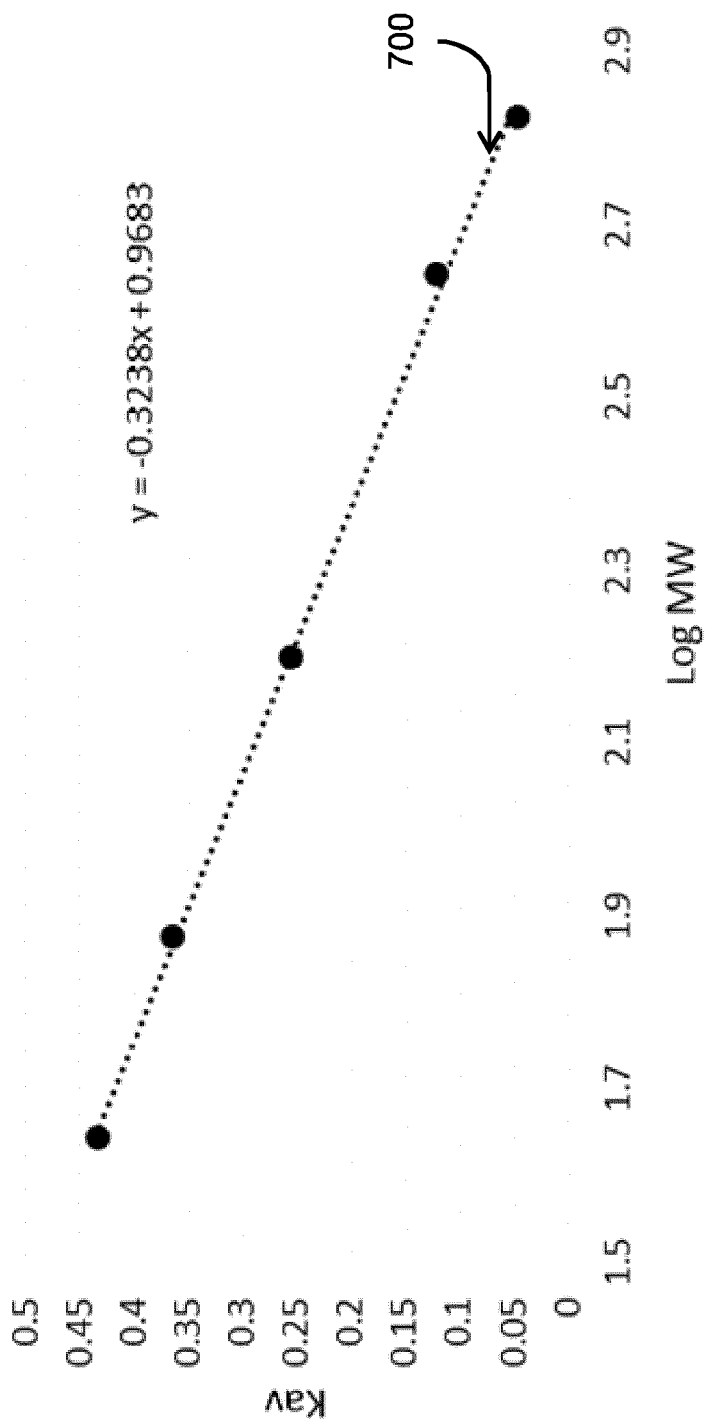
FIG. 7 shows a predetermined relation according to one or more embodiments of the present disclosure.

In one example, a line equation, e.g. $y=k*x+m$, is fitted to the value pairs, as further described in relation to FIG. 7.

In one embodiment, the elution progress measure is elution volume Ve, wherein the gel-phase distribution coefficient Kav is dependent on a total volume of the column Vt, the elution volume Ve and column void volume V0.

Additionally, or alternatively, the gel-phase distribution coefficient Kav is given by the relation: $Kav=((Ve-V0))/((Vt-V0))$, where Ve is the elution volume, V0 is the column void volume and Ve is the elution volume.

Additionally, or alternatively, the predetermined relation is a polynomial relation.

Step 640: rendering a representation 300 indicative of the quantitative measure and the size measure.

The representation 300 may comprise a diagram, e.g. as described in relation to FIG. 3.

Additionally, or alternatively, the representation 300 is a diagram having the quantitative measure represented on a first axis and the molecular size on a second axis, e.g. as described in relation to FIG. 3.

Step 650: controlling a display to display the representation to a user of the chromatography apparatus.

In one example, the display 418 of the chromatography apparatus 400 is controlled to display the representation 300 by sending a control signal from the processing circuitry to the display 418.

In one embodiment, the method further comprises activating or deactivating fractionation using the estimated molecular size and one or more predetermined intervals of molecular sizes.

In one example, the outlet valve 420 activates or deactivates fractionation by distributing the eluent to one or more outlets or outlet ports 421-423 in response to a control signal received from the control unit 410, e.g. using the estimated molecular size and one or more predetermined intervals of molecular sizes.

FIG. 7 shows a predetermined relation according to one or more embodiments of the present disclosure. As previously described in relation to FIG. 6, the molecular size may be estimated by using the predetermined relation, comprised in the reference data, and by using the elution progress measure. The size measure, indicative of molecular size of the molecules in the eluate, may then be estimated using the predetermined relation.

In FIG. 7, a curve in the form of a line 700 is shown. Value pairs comprising a gel-phase distribution coefficient Kav and corresponding molecular size is shown as enlarged black dots in the figure. The line is then curve fitted to the value pairs, e.g. using regression or any other suitable curve fitting technique.

It is envisioned that a curve described by a polynomial relation may alternatively be used for curve fitting to the value pairs.

In FIG. 7, an example relation y=0.3238x+0.9683 has been obtained using curve fitting based on the value pairs.

In one embodiment, a computer program is provided and comprises computer-executable instructions for causing the control unit 410, when the computer-executable instructions are executed on the processing circuitry comprised in the control unit 410, to perform any of the method steps described herein.

In one embodiment, a computer program product is provided and comprises a computer-readable storage medium, the computer-readable storage medium having the computer program above embodied therein.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the control unit 410 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processing circuitry and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processing circuitry" and/or "processing means" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A computer implemented method performed by a chromatography apparatus configured to separate molecules, having varying size, from an eluent, the method comprising:
   obtaining reference data for a chromatography column of the chromatography apparatus, wherein the reference data is indicative of elution characteristics for a set of molecular sizes,
   obtaining an elution progress measure and a corresponding quantitative measure indicative of a concentration of molecules in an eluate of the chromatography apparatus,
   estimating a size measure indicative of molecular size of the molecules in the eluate,
   rendering a representation indicative of the quantitative measure and the size measure,
   controlling a display to display the representation to a user of the chromatography apparatus,
   wherein the molecular size is estimated using a predetermined relation, comprised in the reference data, and the elution progress measure,
   further wherein the predetermined relation is indicating a curve, and the predetermined relation is obtained by performing curve fitting of value pairs comprising a gel-phase distribution coefficient (Kav) and corresponding molecular size.

2. The method according to claim 1, wherein the elution progress measure is elution volume (Ve), wherein the gel-phase distribution coefficient (Kav) is dependent on a total volume of the column (Vt), the elution volume (Ve) and column void volume (VO).

3. The method according to claim 1, wherein the gel-phase distribution coefficient (Kav) is given by the relation:

$$Kav = \frac{(Ve - V0)}{(Vt - V0)}.$$

4. The method according to claim 1, wherein the predetermined relation is a polynomial relation.

5. The method according to claim 1, wherein the quantitative measure is indicative of ultraviolet light absorption of the eluate.

6. The method according to claim 1, wherein the elution progress measure is indicative of elution process running time or eluate volume.

7. The method according to claim 1, wherein the representation is a diagram having the quantitative measure represented on a first axis and the molecular size on a second axis.

8. The method according to claim 1, further comprising activating or deactivating fractionation using the molecular size and one or more predetermined intervals of molecular sizes.

9. A chromatography apparatus configured to separate molecules, having varying size, from an eluent, the chromatography apparatus comprising:
- a column,
- a display, and
- a control unit comprising circuitry, the circuitry comprising:
  - a processing circuitry, and
  - a memory, said memory comprising instructions executable by said processing circuitry, whereby said chromatography apparatus is configured to perform the method according to claim 1.

10. A computer program comprising computer-executable instructions for causing a control unit, when the computer-executable instructions are executed on processing circuitry comprised in the control unit, to perform any of the method steps according claim 1.

11. A computer program product comprising a computer-readable storage medium, the computer-readable storage medium having the computer program according to claim 10 embodied therein.

* * * * *